(12) United States Patent
Schleef et al.

(10) Patent No.: US 8,919,414 B2
(45) Date of Patent: Dec. 30, 2014

(54) ROLLER BLIND CASSETTE AND ROLLER BLIND SYSTEM

(75) Inventors: Thomas Schleef, Porta Westfalica (DE); Herbert Walter, Ebersbach (DE)

(73) Assignee: Bos GmbH & Co. KG, Ostfildern (DE)

( * ) Notice: Subject to any disclaimer, the term of this patent is extended or adjusted under 35 U.S.C. 154(b) by 119 days.

(21) Appl. No.: 13/422,443

(22) Filed: Mar. 16, 2012

(65) Prior Publication Data

US 2012/0234501 A1     Sep. 20, 2012

(30) Foreign Application Priority Data

Mar. 18, 2011 (DE) .......................... 10 2011 005 819

(51) Int. Cl.
*E06B 9/08* (2006.01)

(52) U.S. Cl.
USPC .................................. 160/23.1; 160/178.1 R

(58) Field of Classification Search
USPC ...................... 160/23.1, 24, 178.1 R, 370.22; 29/897.33, 455.1, 33 D, 453
See application file for complete search history.

(56) References Cited

U.S. PATENT DOCUMENTS

| | | | | |
|---|---|---|---|---|
| 2,651,358 A * | 9/1953 | Lorentzen | ............... | 160/178.1 R |
| 2,673,608 A * | 3/1954 | Nelson | ................... | 160/178.1 R |
| 3,146,824 A * | 9/1964 | Veilleux | ...................... | 160/23.1 |
| 3,425,480 A * | 2/1969 | Abate et al. | ............ | 160/178.1 R |
| 4,662,596 A * | 5/1987 | Haarer | .......................... | 248/251 |
| 4,750,539 A * | 6/1988 | Chang | ................... | 160/176.1 V |
| 6,032,718 A * | 3/2000 | Chen | ........................ | 160/370.22 |
| 7,621,313 B2 * | 11/2009 | Pham | ............................ | 160/250 |
| 2012/0234501 A1 * | 9/2012 | Schleef et al. | ............... | 160/23.1 |

FOREIGN PATENT DOCUMENTS

| | | |
|---|---|---|
| DE | 195 27 068 A1 | 1/1997 |
| DE | 197 07 674 A1 | 8/1998 |
| DE | 101 02 799 C1 | 3/2002 |
| DE | 201 03 037 U1 | 8/2002 |
| DE | 101 08 216 A1 | 9/2002 |
| DE | 10 2005 042 832 B3 | 3/2007 |

OTHER PUBLICATIONS

Search Report in European Patent Office issued in Application No. 12159111.9 dated Sep. 20, 2012 with English translation of category of cited documents (7 pages).
Office Action issued in German Application No. 102011005819.2 dated Aug. 30, 2011 (10 pages).

* cited by examiner

*Primary Examiner* — Blair M. Johnson
(74) *Attorney, Agent, or Firm* — Flynn, Thiel, Boutell & Tanis, P.C.

(57) ABSTRACT

A roller blind cassette for receiving a roller blind shaft and a roller blind which in the stowed state is wound onto the roller blind shaft and in a functional state is drawn in a longitudinal direction through an exit slot of the roller blind cassette. The cassette has a housing with a hollow section slotted along its length and extending in a direction transverse to the longitudinal direction and forming the exit slot of the roller blind cassette. Two opposite edge regions extend on both sides of the slot of the hollow section and are connected to one another in the region of two opposite ends of the hollow section by a connecting bridge, the connecting bridge being connected to one of the edge regions by a connecting arrangement that counters in a positive manner the freedom of the connecting bridge to rotate at the edge region.

14 Claims, 5 Drawing Sheets

ROLLER BLIND CASSETTE AND ROLLER BLIND SYSTEM

CROSS REFERENCE TO RELATED APPLICATION

This application claims the priority of German Application No. 10 2011 005 819.2, filed Mar. 18, 2011, the disclosure of which is hereby incorporated by reference in its entirety into this application.

FIELD OF THE INVENTION

The invention relates to a roller blind cassette for receiving a roller blind shaft and a roller blind which in the stowed state is wound onto the roller blind shaft and in a function state can be drawn in a longitudinal direction off the roller blind shaft through an exit slot of the roller blind cassette, having a housing which has a hollow section slotted along its full length and extending in a main extension direction transversely to the longitudinal direction and whose slot forms the exit slot of the roller blind cassette.

BACKGROUND OF THE INVENTION

Generic roller blind cassettes are widely known from the prior art and are used for roller blinds in motor vehicles, for instance for roller shades or as covers for luggage compartments, in order to hold the wound roller blind when it is not necessary for it to be in its function state. The base element of such roller blind cassettes, which is formed as a slotted hollow section, is advantageous from a production engineering point of view when compared with a closed hollow section that is subsequently machined, since it involves a reduced machining effort and the costs can therefore be reduced. Slotted hollow sections of this type are however significantly less resistant to torsion than closed hollow sections, since their edges in the area of the slot provide little resistance to a relative displacement in the main extension direction. In known roller blind cassettes with a slotted hollow section, comparatively thick medium plate, in particular having walls thicker than 1.5 mm, is used to obtain an adequate resistance to torsion. Thinner walls have until now been regarded as disadvantageous, since they cannot ensure adequate resistance to torsion in the roller blind cassette.

A disadvantage of these roller blind cassettes known from the prior art and having thick walls is that they have comparatively high mass. There is however a growing need to reduce the mass of every component used in a vehicle in order to increase its efficiency. A reduction in the mass is also desirable for roller blind cassettes.

SUMMARY OF THE INVENTION

The object of the invention is therefore to further develop a generic roller blind cassette such that it has a low mass while being adequately resistant to torsion.

In accordance with the invention, this is achieved in accordance with a first aspect of the invention in that two edge regions opposite one another and extending in the main extension direction on both sides of the slot of the hollow section are connected to one another in the region of two opposite ends of the hollow section by a connecting bridge, with this connecting bridge being connected to at least one of the edge regions by connecting means that counter in a positive manner the freedom of the connecting bridge to rotate at the edge region transversely to the main extension direction of the roller blind cassette.

In accordance with the invention, it is therefore provided that the edge regions of the cassette are directly connected to one another, this connection being implemented by a connecting bridge in such a way that the connecting bridge is fastened at at least one edge in such a way that it cannot twist around a rotational axis aligned transversely to the main extension direction, since this would counter the desired resistance to torsion. Preventing the freedom to rotate at both the edge regions that are connected to one another by the connecting bridge is advantageous but not strictly necessary, since the rotary fixing mentioned above of the connecting means at one edge region achieves fixing that makes it possible to design the fixing on the other side more simply. An edge region is understood in the meaning of this invention to be a region that is not more than 15 mm away from the slot in the hollow section, and preferably not more than 10 mm. At least part of the transfer of force from the hollow section into the connecting bridge takes place within this edge region.

The connection as described of the opposed edge regions by means of a connecting bridge can achieve a significant increase in the resistance to torsion, so it is no longer necessary to use very thick plate materials. The mass can therefore be reduced.

Particularly simple designs of the connection between the roller blind cassette and the connecting bridge can be achieved if screwed or riveted joints are used here, where two such screws or rivets should be provided in such cases at at least one of the two ends in order to provide a positive prevention of the freedom to rotate.

In an alternative embodiment, which is particularly advantageous from the point of view of easy assembly, the connecting means used to connect the connecting bridge to the hollow section incorporate a receiving shaft in the edge region of the housing and formed by the housing, into which an insertion piece on the connecting bridge, preferably made in one piece therewith, is inserted in the main extension direction. In such a design, therefore, suitable shaping of the hollow section forms a receiving shaft that extends in the main extension direction and into which is inserted an insertion piece of the connecting bridge that also extends in the main extension direction. It is possible here for the receiving shaft and the insertion piece to have a constant cross-section along their length. It is however advantageous for the insertion piece to taper slightly towards its more remote end, so that when the insertion piece is fully inserted there is also a non-positive coupling between the housing and the insertion piece with respect to a relative movement in the main extension direction. It is furthermore advantageous with this design when receiving shafts of this type are provided on both sides of the slot, and when the connecting bridge incorporates two substantially parallel insertion pieces that are pushed into these receiving shafts at the two opposite edge regions.

The aforementioned taper allows a press-fit connection to be created which counters non-positively any withdrawal of the connecting bridge from the receiving shafts or from the at least one receiving shaft. Positive prevention of withdrawal is advantageous. This can, for instance, be formed by a connecting screw, connecting pin or connecting rivet passing through the hollow section in the region of the receiving shaft and through the insertion piece. In a particularly advantageous embodiment however, positive fastening means are provided on the hollow section and the insertion piece, in particular in order to create a snap connection by means of which the insertion piece is secured in the receiving shaft to prevent withdrawal. These fastening means are preferably designed such that they achieve a secured state simply by insertion of the insertion piece into the receiving shaft. The method of operation can here be that of a barbed hook. This results in a very simple assembly process, since it is only necessary to bring the connecting bridge with the insertion piece that is moulded onto it from the side up to the hollow section and to push it in to create the desired connection. A specific design of the fastening means could however provide that recesses or depressions are provided in the hollow section on the inside of the receiving shaft, into which a tongue provided on the insertion piece can be snapped as soon as the insertion piece has been introduced far enough into the receiving shaft. A complementary design in which the recess or the depression is provided on the insertion piece while the tongue is formed on the hollow section is equally effective.

To create the receiving shaft, it is preferably provided that the edge region of the hollow section is folded over on both sides of the slot in the edge region adjacent to the slot, thereby creating slot-like receiving shafts on both sides.

The connecting bridge can be designed such that it merely provides the connection between the two opposite edge regions, but nevertheless leaves the ends of the hollow section unclosed. It can however also be effective if the connecting bridge is made in particular in one piece with an end cap closing off the end of the hollow section and at least to a large extent closing the open end of the housing. In such a design, the connecting bridge thus performs a double function. It is the support for the end wall of the housing that is fastened to or moulded on it, and at the same time stabilizes the housing to prevent torsion. The end wall can at the same time also have the purpose of being the bearing location for the roller blind shaft rotatably mounted inside the housing.

The invention furthermore relates to a designed related to the design as described above, where a generic roller blind cassette is further developed such that a connecting bridge extends over the slot from at least one edge region to at least one of the ends and is made in one piece with the hollow section and whose more remote end is fastened to the opposite region. Alternatively, connecting bridges can extend over the slot from both the opposite edge regions to at least one end of the hollow section, each bridge being made in one piece with the hollow section, and whose more remote ends are connected to one another.

With such a design, a separate connecting bridge is therefore omitted. Instead, one or two connecting bridges made in one piece with the hollow section are used at each end. If only one such connecting bridge is used at each end, it extends over and past the slot, and is connected on the opposite side to the edge region in that area in such a way that a relative movement of the connecting bridge with respect to the edge region in the direction of the main extension direction is prevented. In this way, the desired resistance to torsion is again achieved. The fastening used there is preferably a positive one, which again can be formed using a screwed or riveted connection passing through the connecting bridge and the hollow section. In the design with two connecting bridges at each end that extend from the opposite sides towards each other, this connection is flush with the slot.

This design again achieves a high level of resistance to torsion which also, due to the material bond arising from the connecting bridge being in one piece with the hollow section, can offer even greater stability than when an entirely separate connecting bridge is used.

The minimum of one connecting bridge at each end is preferably formed by making a cut in the hollow section transversely to the main extension direction, by which cut the connecting bridge is separated from a folded edge region of the exit slot. This makes it possible during manufacture, after making this cut extending transversely to the main extension direction, to fold over the edge region(s) in the area where the exit slot is to be formed, with the connecting bridge(s) remaining unaffected by this as a result of the cut. This makes it easy to manufacture.

A roller blind cassette in accordance with the invention is preferably a roller blind cassette made of metal, in particular made from metal plate of constant thickness. In order to achieve a low mass, this thickness is preferably no more than 1.5 mm, and in particular preferably no more than 1 mm. As is made clear above, this low wall thickness of the hollow section can be sufficient thanks to the resistance to torsion achievable with the connecting bridge. The connecting bridge itself is, even when it is provided as a separate component, also preferably made of metal. Here again this is preferably a metal plate component which is given the desired form through by or a similar process so that, for instance, an insertion piece of the type described above can be formed in this way.

The roller blind cassette in accordance with the invention is used in a roller blind in accordance with the invention which is in particular provided and designed for use in a vehicle. This roller blind comprises, in addition to the roller blind cassette in accordance with the invention, a roller blind shaft rotatably mounted inside the roller blind cassette along with a roller blind which is wound onto the roller blind shaft and which can be wound off the roller blind shaft.

BRIEF DESCRIPTION OF THE DRAWINGS

Further advantages and aspects of the invention emerge not only from the claims but also from the description below of preferred embodiments of the invention, which are explained in more detail. Shown here in FIGS. 1a and 1b illustrate a first embodiment of a roller blind cassette in accordance with the invention with a separate connecting bridge.

DETAILED DESCRIPTION

Figure 1:
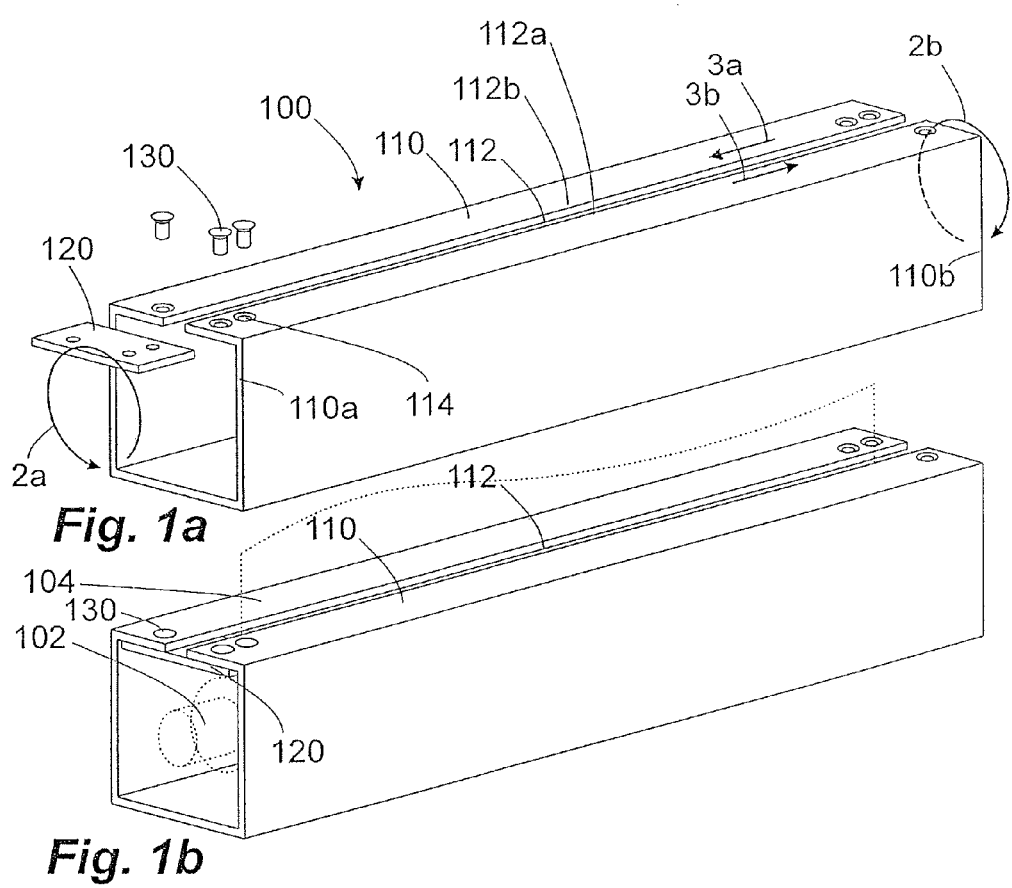

FIGS. 1a and 1b illustrate schematically a first embodiment of a roller blind cassette in accordance with the invention. This roller blind cassette 100 primarily comprises an open, hollow section 110 designed as a curved piece of metal plate. The thickness of the walls of this hollow section is in the region of 1 mm. As a result of being made as an open hollow section, it is easy and economical to fabricate. Nevertheless, an open and hollow section such as this has a tendency to twist markedly if subjected to the torsion indicated by the arrows 2a, 2b. The resultant movement of the hollow section 110 in the longitudinal direction is illustrated by the arrows 3a and 3b. In order to prevent this, connecting bridges 120 are provided at both of the ends 110a, 110b of the hollow section 110, where for the sake of clarity only the connecting bridge on the left-hand side is illustrated in the embodiments of FIGS. 1 to 5.

In the case of the embodiment of Figs. 1a and 1b, the connecting bridge 120 is a simple strip of metal plate. This is, as illustrated in FIG. 1b, mounted on the inside in the region of a slot 112 of the hollow section 110, and connected to the edge regions 112a, 112b on both sides of the slot by means of rivets 130. Here, at least in one edge region 112a, two holes 114a are provided for these rivets 130, so that after the connecting bridge 120 has been fastened as shown in FIG. 1b, the connection is fixed, and in particular fixed so that it cannot rotate, relative to the edge region 112a. In the edge region 112b on the opposite side, in the embodiments of Figs. 1a and 1b, only one rivet 130 is provided to connect the hollow section 110 to the connecting bridge 120. It is of course possible to improve the force transfer by providing a second rivet here as well.

The hollow section made in this way to hold a roller blind shaft 102 illustrated in FIG. 1b, and whose purpose is to wind up a roller blind 104, can be made economically and is exceptionally stable. It is therefore an economical alternative to what was originally a closed hollow section, in which the outlet slot is created after the hollow section has been manufactured.

Figure 2:
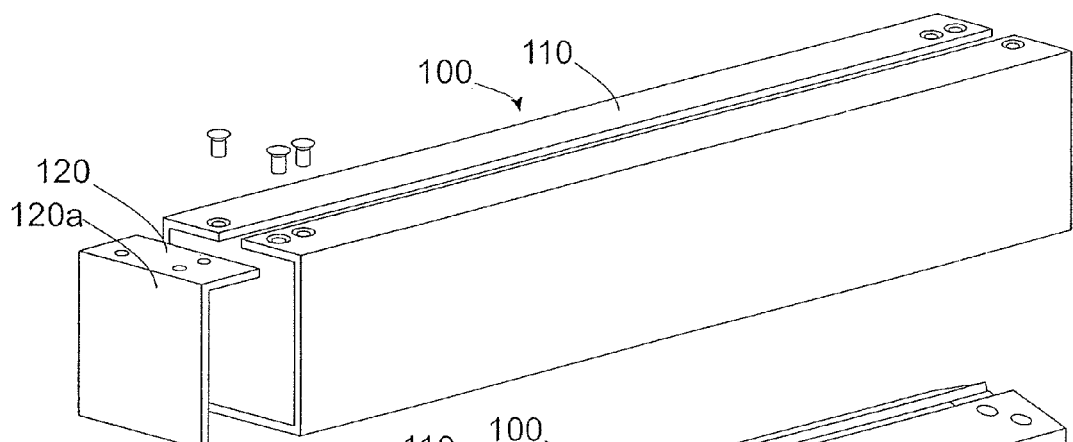
FIG. 2 illustrates a second embodiment of a roller blind cassette in accordance with the invention with a separate connecting bridge.

The embodiment of FIG. 2 illustrates how the connecting bridge 120 does not necessarily have to be made as a simple, plane connecting strip. Instead it can be shaped in such a way that it partially or fully closes the open cross-section found at the ends 110a, 110b of the hollow section. In such a case, it is advantageous if the end wall 120a, which is preferably made in one piece with the connecting bridge, also has on its inner face bearing means, not illustrated, for mounting of the winding shaft 102.

Figure 3:
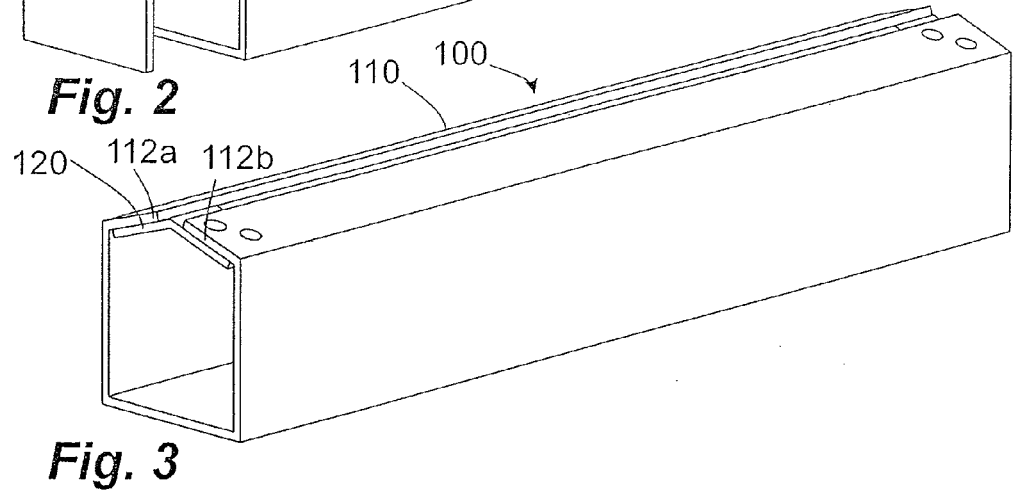
FIG. 3 illustrates a third embodiment of a roller blind cassette in accordance with the invention with a separate connecting bridge.

FIG. 3 illustrates that the stabilization of the open, hollow section by means of a connecting bridge 120 is not restricted to cassettes in which the edge regions 112a, 112b are aligned with one another on both sides of the slot 112. Instead, it is quite possible for the slot 112 to be located in an exposed position between two edge regions 112a, 112b that are angled relative to one another. In such a case, the connecting bridge 120 is provided as a curved component in the manner shown in FIG. 3.

Figure 4A:
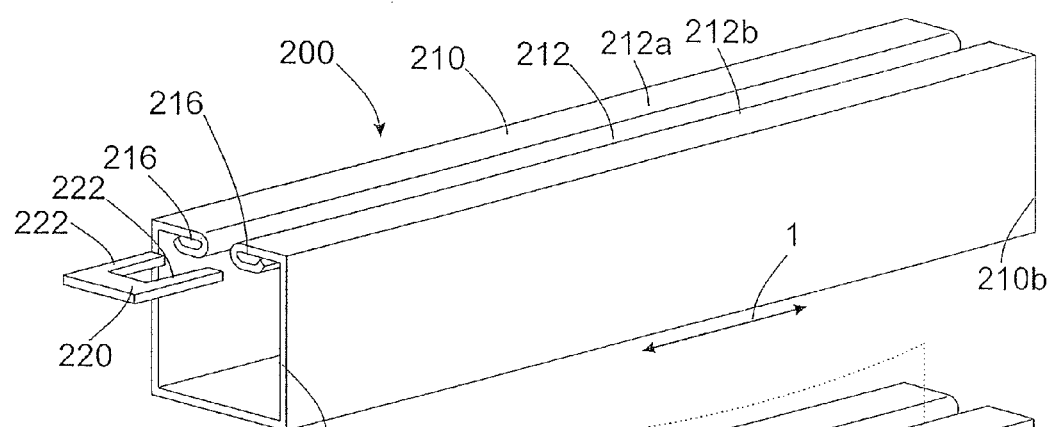
FIGS. 4a and 4b illustrate a fourth embodiment of a roller blind cassette in accordance with the invention with a separate connecting bridge.
Figure 4B:
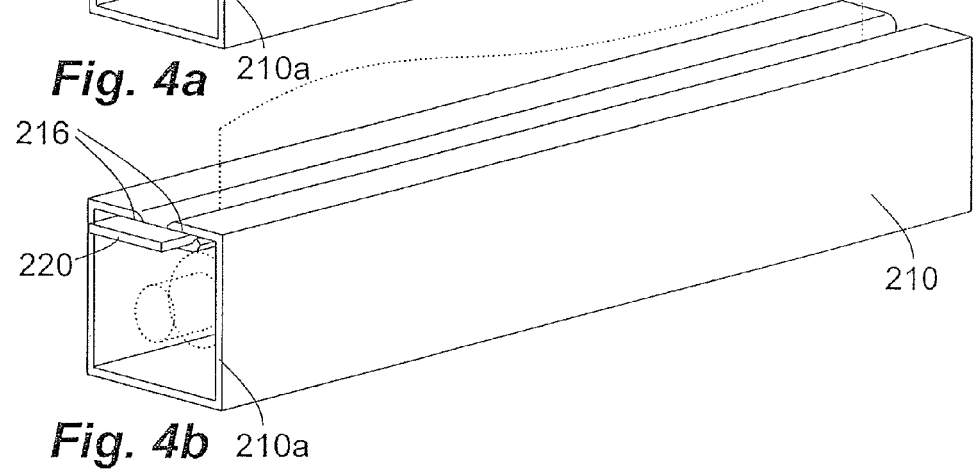

FIGS. 4a and 4b illustrate a further embodiment of a roller blind cassette 200 in accordance with the invention. In this, connecting means separate from the hollow section 210 and the connecting bridge 220 are not used. Instead, the hollow section 210 is folded over in the region of the slot 212 at each of the edge regions 212a and 212b, so that two receiving shafts 216 are formed at the two ends 210a, 210b. Correspondingly, the connecting bridge 220 is provided with two insertion pieces 222 extending approximately in the main extension direction 1 of the roller blind cassette 200 and slightly tapering towards their more remote end. In this embodiment, these approximately U-shaped connecting bridges 220 are pushed at both ends of the slot 212 into the receiving shafts 216. The receiving shafts 216 and the insertion pieces 222 are here matched to one another such that a permanent non-positive press-fit is created to counter torsion of the roller blind cassette 200. In order to create an adequate press-fit, it is however necessary to push the insertion pieces 222 into the receiving shafts 216 with considerable force.

Figures 5A, 5B:
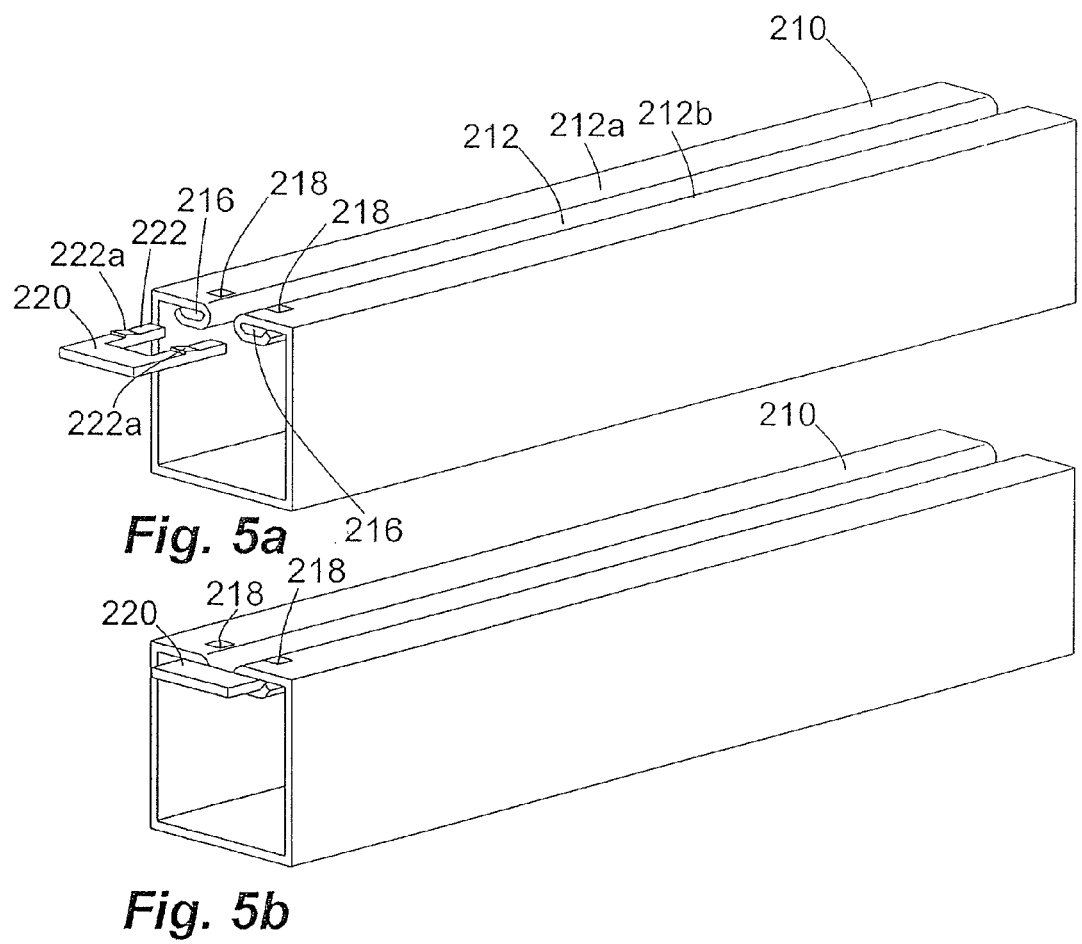
FIGS. 5a and 5b illustrate a fifth embodiment of a roller blind cassette in accordance with the invention, which represents a variation on the embodiment of FIGS. 4a and 4b, and FIGS. 6a and 6b illustrate a sixth embodiment of a roller blind cassette in accordance with the invention with a moulded-on connecting bridge.

The embodiment of FIGS. 5a and 5a is related to this, but has insertion pieces 222 which have engaging thickened portions 222a on their upper faces. These have a vertical face on their outward-looking sides, and—taking FIG. 5a as a reference—extended sloping faces on the ends facing towards the receiving shaft 216. Corresponding to these, recesses 218 are provided in the edge regions 212a, 212b on both sides of the slot 212, into which the thickened portions 222a can engage.

When assembling the roller blind cassette according to FIGS. 5a and 5b, considerably less force is therefore necessary in comparison with assembling the embodiment of FIGS. 4a and 4b. As soon as the two insertion pieces 222 of the connecting bridge 220 are pushed far enough into the receiving shafts 216, the engaging thickened portions 222a snap into the recesses 218, and, in the manner of a barbed hook, effectively prevent a relative movement in opposite directions between the edge regions 212a and 212b. High torsional stiffness of the roller blind cassette 200 is again the result.

Figures 6A, 6B:
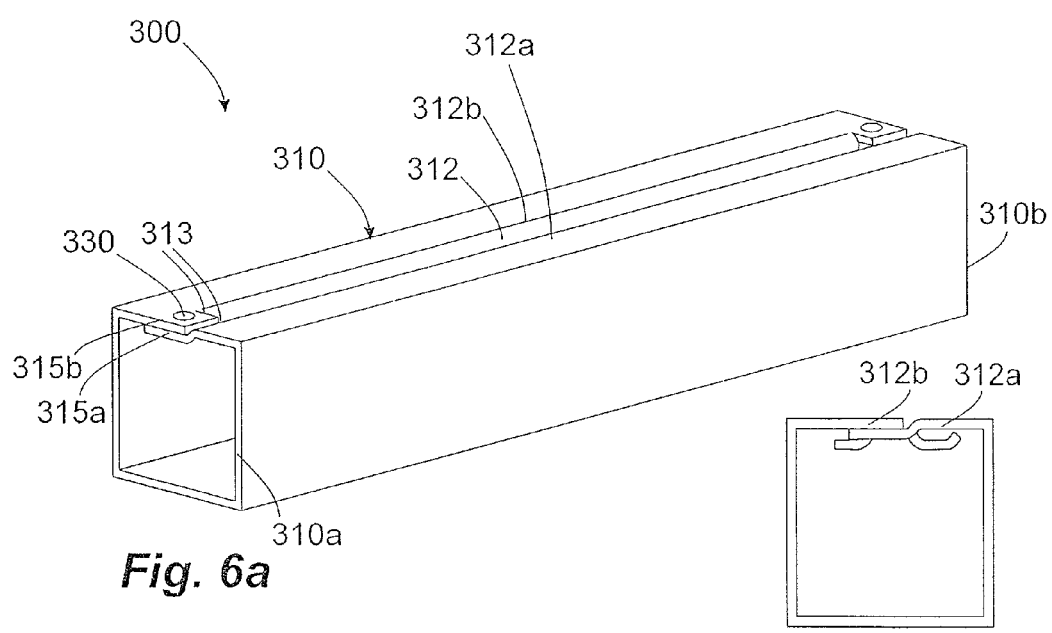

There is no separate connecting bridge in the embodiment according to FIG. 6a. The edge regions 312a, 312b are instead folded over in a similar manner to the embodiment of FIGS. 4 and 5. In the regions of each of the two ends 310a, however, a cut 313 is made, as a result of which the connecting bridges 315a, 315b are left out of the folding process. These therefore extend substantially in the same plane as the edge region 312a and 312b, and overlap one another. In the region of the overlap, they are connected to one another by a connecting means, here taking the form of a rivet 330. The torsional stiffness achieved in this way is greater even than the torsional stiffness of the foregoing embodiments, since, due to the forming of the connecting bridges 315a, 315b in one piece with the hollow section 310, there is no reason to expect the connecting bridges to separate from the hollow section 310.

In an alternative embodiment, not shown in the drawing, a connecting bridge is only formed on one of the two sides, extending toward the opposite side. On the far side of the exit slot, this overlaps the opposite edge region and is again fastened there by a connecting means such as a rivet.

The invention claimed is:

1. A roller blind arrangement for use in a vehicle, said arrangement comprising:
    a roller blind cassette having a housing including a hollow section extending in a main extension direction, an exit slot extending along a full extent of said hollow section and a pair of edge regions disposed opposite one another on both sides of said exit slot and extending in the main extension direction, each said edge region being folded over on itself to define first and second edge walls disposed in closely adjacent, opposed and facing relation with one another, said first and second edge walls being spaced from one another to define a slot-shaped receiving area therebetween, said first and second edge walls of each said edge region adjoining one another at a bent region which defines a boundary of said exit slot;
    a roller blind shaft defining an axis substantially parallel to the main extension direction, said roller blind shaft being mounted within said cassette for rotation about the axis;
    a roller blind disposed within said cassette and wound onto said roller blind shaft in a stowed configuration and unwound from said roller blind shaft in a functional configuration in which said roller blind is at least partially extended, in a longitudinal direction transverse to the main extension direction, from said roller blind shaft through said exit slot; and
    said edge regions located opposite one another at at least one end of said housing being interconnected to one another by a flat, plate-shaped and rigid metal connecting bridge, said connecting bridge having respective insertion pieces inserted in a direction substantially parallel to the main extension direction into the respective slot-shaped receiving areas at said one end of said housing, the respective said insertion pieces and said slot-shaped receiving areas being configured to create a permanent press-fit between said connecting bridge and said one end of said housing to prevent rotation of said connecting bridge relative to the respective edge regions.

2. The roller blind arrangement of claim 1, wherein each said slot-shaped receiving area opens outwardly in a direction substantially parallel to the main extension direction.

3. The roller blind arrangement of claim 2, wherein said connecting bridge extends between said edge regions in a direction substantially parallel with the longitudinal direction.

4. The roller blind arrangement of claim 3, wherein said connecting bridge is substantially U-shaped and has a central portion, said insertion pieces being connected to and extending outwardly from opposite ends of said central portion in a direction substantially parallel with the main extension direction, said insertion pieces being oriented substantially parallel to one another, and said central portion and said insertion pieces all being oriented in the same plane.

5. The roller blind arrangement of claim 4, wherein said hollow section of said housing comprises a tubular side wall which is elongated in the main extension direction, said first and second edge walls of each of said edge regions each forming a part of said side wall and said exit slot being defined in said side wall and extending in the main extension direction therealong.

6. The roller blind arrangement of claim 1, wherein said connecting bridge is a first connecting bridge and said arrangement includes a second flat, plate-shaped and rigid metal connecting bridge substantially identical to said first connecting bridge, said one end of said housing is a first end and said housing includes a second end spaced from said first end, said edge regions located opposite one another at said second end of said housing being interconnected to one another by said second connecting bridge, said second connecting bridge having respective insertion pieces inserted in a direction substantially parallel to the main extension direction into the respective slot-shaped receiving areas at said second end of said housing, the respective said insertion pieces of said second connecting bridge and said slot-shaped receiving areas at said second end of said housing being configured to create a permanent press-fit between said second connecting bridge and said second end of said housing to prevent rotation of said second connecting bridge relative to the respective edge regions at said second end.

7. The roller blind arrangement of claim 1, wherein said first edge walls define terminal free ends of the respective said edge regions and extend inwardly in a direction away from one another, each said first edge wall being substantially parallel with the corresponding second edge wall.

8. The roller blind arrangement of claim 1, wherein said first and second edge walls are disposed immediately adjacent said exit slot and each said first edge wall is directly adjoined to the corresponding second edge wall at said bent region.

9. The roller blind arrangement of claim 1, wherein said hollow section has spaced-apart top and bottom walls and spaced-apart first and second side walls interconnecting said top and bottom walls and being oriented transversely to said top and bottom walls, said exit slot being disposed in said top wall and each said edge region forming part of said top wall, said first and second edge walls of each said edge region being oriented transversely to said side walls.

10. The roller blind arrangement of claim 1, wherein said hollow section has spaced-apart top and bottom walls and spaced-apart first and second side walls interconnecting said top and bottom walls and being oriented transversely to said top and bottom walls, said exit slot being disposed in said top wall and each said edge region and said first and second edge walls thereof forming part of said top wall, and said slot-shaped receiving areas are defined solely by said top wall.

11. A roller blind arrangement for use in a vehicle, said arrangement comprising:
a roller blind shaft defining an axis;
a roller blind cassette including an elongated tubular housing defining therein a hollow interior, said housing having first and second axially-spaced ends and a pair of edge portions which are spaced from one another in a direction transverse to the axis to define an exit slot therebetween which extends in the axial direction along the entire longitudinal extent of said housing, each said edge portion at said first and second ends of said housing having a free end immediately adjacent said exit slot, each said free end being folded over onto itself to define an edge wall which is spaced from and in overlapping and superimposed relation with a remaining substantially unfolded part of said free end so as to define a slot which opens axially outwardly, each said remaining substantially unfolded part directly adjoining the respective said edge wall at a bent transition area which defines a boundary of said exit slot, said roller blind shaft being mounted within said cassette for rotation about the axis;
a roller blind wound onto said roller blind shaft in a stowed configuration and unwound from said roller blind shaft in a functional configuration in which said roller blind is at least partially extended from said roller blind shaft through said exit slot in an extension direction oriented transversely to the axial direction; and
a flat, plate-shaped and rigid metal connector disposed at each of said first and second ends of said housing, said connectors extending between and interconnecting said edge portions at said first and second ends of said housing in a direction transverse to the axis, each said connector having a pair of extensions extending axially within the respective said slots at each of said first and second ends of said housing, the respective said extensions and said slots being configured to create a permanent press-fit between said connecting bridge and said housing to minimize torsion thereof.

12. The roller blind arrangement of claim 11, wherein each said connector is substantially U-shaped and has a central portion, said extensions of each said connector being connected to and extending outwardly from opposite ends of the corresponding said central portion in the axial direction, said extensions being oriented substantially parallel to one another, and said central portion and said extensions of each said connector all being oriented in the same plane.

13. The roller blind arrangement of claim 11, wherein said edge walls extend inwardly and away from one another in a substantially parallel manner with the corresponding remaining substantially unfolded part of the respective said free end.

14. The roller blind arrangement of claim 11, wherein said housing has spaced-apart top and bottom walls and spaced-apart first and second side walls interconnecting said top and bottom walls and being oriented transversely to said top and bottom walls, said exit slot being disposed in said top wall and each said edge portion forming part of said top wall, and said slots are defined solely by said top wall.

* * * * *